(12) United States Patent
Le et al.

(10) Patent No.: US 7,197,476 B2
(45) Date of Patent: Mar. 27, 2007

(54) ELECTRONIC AUCTION METHOD AND SYSTEM FOR GENERATING OFF-INCREMENT PROXY BIDS

(75) Inventors: Hanh Kim Le, Austin, TX (US); William James Morrison, Gilmanton, NH (US); Rebecca Lynn Roberts, Austin, TX (US); Leland James Wiesehuegel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1163 days.

(21) Appl. No.: 09/747,535

(22) Filed: Dec. 21, 2000

(65) Prior Publication Data

US 2002/0082971 A1 Jun. 27, 2002

(51) Int. Cl.
*G06Q 30/00* (2006.01)
(52) U.S. Cl. .................................................. 705/26
(58) Field of Classification Search .................. 705/26, 705/27, 37
See application file for complete search history.

(56) References Cited

U.S. PATENT DOCUMENTS

| | | | | |
|---|---|---|---|---|
| 5,835,896 | A * | 11/1998 | Fisher et al. ................... | 705/37 |
| 6,085,176 | A | 7/2000 | Woolston ...................... | 705/37 |
| 6,101,484 | A | 8/2000 | Halbert et al. ................. | 705/26 |
| 6,243,691 | B1 * | 6/2001 | Fisher et al. ................... | 705/37 |
| 6,609,112 | B1 * | 8/2003 | Boarman et al. .............. | 705/37 |
| 2001/0029478 | A1 * | 10/2001 | Laster et al. ................... | 705/37 |
| 2001/0044771 | A1 * | 11/2001 | Usher et al. ................... | 705/37 |
| 2002/0049664 | A1 * | 4/2002 | Hoffman et al. .............. | 705/37 |
| 2002/0116313 | A1 * | 8/2002 | Detering ....................... | 705/37 |
| 2003/0083983 | A1 * | 5/2003 | Fisher et al. ................... | 705/37 |

FOREIGN PATENT DOCUMENTS

EP 1 041 502 A2 * 10/2000

OTHER PUBLICATIONS

Savetz, Kevin "Click Once, Click Twice. Sold! Online auction sites let you bid your way to a bargain PC.", Computer Shopper, p. 178, Jul. 2000. Retrieved from Dialog File: Acc#: 07439344.*

* cited by examiner

*Primary Examiner*—Naeem Haq
(74) *Attorney, Agent, or Firm*—Duke W. Yee; David A. Mims, Jr.; Francis Lammes

(57) ABSTRACT

An electronic auction method and system are disclosed for generating off-increment proxy bids. A minimum increment is specified for bidding on an item. A bid for the item is received from a first bidder which is currently a high bid for the item. A previously recorded proxy bid is received from a second bidder which is greater than the current high bid and not greater than the high bid plus the minimum increment. An off-increment bid is generated which does not increase the bid received from the first bidder by the increment and also does not exceed the proxy bid. The off-increment bid becomes a high bid for the item utilizing the proxy bid. The second bidder thus holds a current high bid for the item.

3 Claims, 4 Drawing Sheets

ELECTRONIC AUCTION METHOD AND SYSTEM FOR GENERATING OFF-INCREMENT PROXY BIDS

BACKGROUND OF THE INVENTION

1. Field of the Invention

The present invention relates generally to data processing systems and more particularly to electronic commerce. Still more particularly, the present invention relates to an electronic auction method and system which generates off-increment bids using proxy bids.

2. Description of the Related Art

Prior to the advent of electronic auctioning over computer networks or electronic commerce, auctions were held in a group of gathered bidders with an auctioneer. An auction is conducted on behalf of a seller by an auctioneer. The auctioneer receives a list of items to be sold and possibly a minimum and/or reserve price for those items. During the auction, a plurality of bidders place bids under the guidance and control of the auctioneer. In some cases, multiple bidders may pool their bids, and the pooled bids are submitted as a single bid with a combined quantity to the auctioneer.

The auctioneer enforces the rules of the auction, such as minimum bid price and quantities, minimum bid incrementing from the previous bid for a new bid, and time limits for placing bids. Auction bidders are typically qualified as to their ability to complete the purchase should their bid be the winning bid prior to entering the auction room.

Many online auctioning systems such as "priceline.com" and "mercata.com" have become very popular for individuals and businesses to use to take advantage of auctions at which they cannot be physically present. Such e-commerce auctions or online auctions are usually conducted over a specified period of time of opening and closing for bids, and are typically conducted under one of several well-known sets of rules or models. These common models include "Dutch" auctions, progressive auctions, "Yankee" auctions, single-bid auction, sealed bid auctions, reserve auctions, and hybrids of these types of auctions. The "Dutch" and "Yankee" auctions permit bids on only a part of an offered lot.

However, most sales offering and bid systems conducted by manufacturers of goods or service providers are conducted under a different set of procedures and processes. In a typical trader and broker system for offering and accepting bids, a manufacturer or service provider will notify one or more traders of available products or services, quantities, and minimum acceptable bid values. The trader then provides offerings to one or more brokers, to which the brokers may respond with bids.

In typical auctions, a minimum bid is specified for an item. All entered bids must meet or exceed the minimum in order to be recorded in the auction. Often times, a minimum increment amount is also specified for bidding on the item, such that subsequent bids must exceed the current high bid for the item by the minimum increment amount.

In some known systems, off-increment bids are not permitted. An off-increment bid is a bid which increases the current high bid by an amount which is not an increment of the minimum increment amount. For example, if the current high bid for an item is $40.00 and the minimum increment is $5.00, a new bid of $47.00 would be an off-increment bid.

Some auctions permit proxy offers. A proxy offer allows a potential buyer to participate in the ongoing auction without having to constantly monitor the auction. A potential buyer may enter a proxy offer which is the maximum price this potential buyer is willing to pay for the item. The proxy offer will automatically enter the minimum increment price necessary to exceed the current bid up to the amount of the proxy offer without the buyer's involvement.

Systems which permit proxy bids and require minimum increments in the bidding often produce results which are either unexpected or to the disadvantage of the seller. For example, suppose bidder A has recorded a bid of $30.00 and holds a proxy bid for $45.00 for a particular item. For this item, the minimum increment is set at $5.00. If bidder B subsequently places a bid of $35.00, known systems will award the item to bidder A for $35.00 because bidder A was the first bidder to bid $35.00 via the proxy bid. This result is to the disadvantage of the seller because bidder A would have been willing to overbid bidder B to receive the item. The seller could have sold the item for more than $35.00.

In a second example, suppose bidder A has recorded a bid of $30.00 and holds a proxy bid for $40.00 for a particular item. For this item, the minimum increment is set at $5.00. If bidder B subsequently places a bid of $37.00, some known systems will award the item to bidder A for $30.00 because bidder B's bid is not permitted as an off-increment bid. In this case the seller is again disadvantaged because the item could have been sold for $37.00. Further, bidder A held a proxy bid for $40.00 and could have overbid bidder B's bid of $37.00 up to $40.00 if the minimum increment had permitted the bid.

Using this last example again, in other known systems, bidder B would be awarded the item for $37.00. Again, bidder A's proxy failed to overbid bidder B's bid of $37.00 because of the minimum increment.

Therefore, a need exists for a method and system in an electronic auction which generates off-increment proxy bids.

SUMMARY OF THE INVENTION

An electronic auction method and system are disclosed for generating off-increment proxy bids. A minimum increment is specified for bidding on an item. A bid for the item is received from a first bidder which is currently a high bid for the item. A previously recorded proxy bid is received from a second bidder which is greater than the current high bid and not greater than the high bid plus the minimum increment. An off-increment bid is generated which does not increase the bid received from the first bidder by the increment and also does not exceed the proxy bid. The off-increment bid becomes a high bid for the item utilizing the proxy bid. The second bidder thus holds a current high bid for the item.

The above as well as additional objectives, features, and advantages of the present invention will become apparent in the following detailed written description.

BRIEF DESCRIPTION OF THE DRAWINGS

The following detailed description when taken in conjunction with the figures presented herein provide a complete disclosure of the invention.

DETAILED DESCRIPTION OF THE INVENTION

Figure 1:
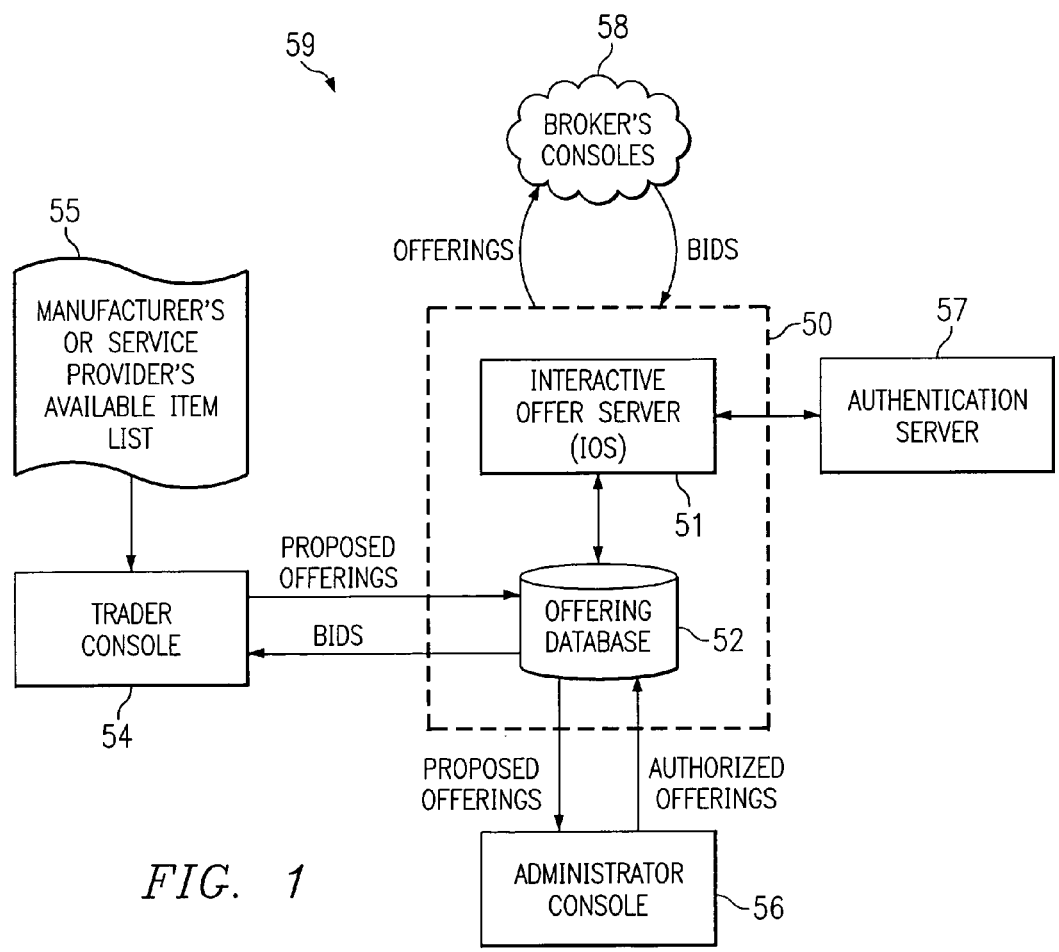
FIG. 1 depicts a general architecture of an Interactive Offer System ("IOS") in which the present invention may be implemented.

The present method and system is preferably realized in a plurality of networked computers, including computer network terminals or consoles, networked database application servers, web servers, and a computer network. The computer network consoles employed are any suitable device for accessing remote application services over a computer network, including, but not limited to: personal computer-based web browsers, wireless web browsers such as web-enabled wireless telephones and personal digital assistants ("PDA"), Internet appliances, and dedicated computer terminals. The database application servers employable in the invention may be any of a wide array of available database application servers, including, but not limited to: IBM Lotus Notes servers, Oracle servers, etc. The web servers incorporated into the invention may be any suitable platform, including, but not limited to: IBM's Web Sphere product, Apache Hyper Text Transfer Protocol ("HTTP") servers, secure HTTP servers ("HTTPS"), and the like. The computer network may include the Internet, intranets, extranets, dedicated networks such as local area networks ("LAN") and wide area networks ("WAN"), wireless data networks, and/or any other suitable computer and data communications network. Communications means between database application servers, computer network consoles, and web servers may include any suitable data communications protocols and media including, but not limited to: dial-up modems over telephone lines, wireless data transceivers, cable modems, Digital Subscriber Lines ("DSL"), and dedicated data communication lines.

It will be recognized by those skilled in the art that certain combinations and integrations of the features presented herein may be made without departing from the spirit and scope of the invention. Further, it will be recognized that many of the architectural details disclosed herein are disclosed under the inventor's preferred embodiment in order to enhance the robustness and reliability of the invention, but these details may not be necessary to realize the fundamental functionality of the invention.

The present invention is an electronic auction method and system for generating off-increment proxy bids. A minimum increment is specified for bidding on items. A bid for the item is received from a first bidder which is currently a high bid for an item. Previously recorded proxy bids are then searched to select the largest, earliest entered proxy bid which is equal to or greater than the bid entered by the first bidder. If no proxy bids meet or exceed this new bid, the first bidder is awarded the item at the bid entered by the first bidder.

If at least one proxy bid exists which meets or exceeds the bid entered by the first bidder, the largest, earliest entered proxy bid which meets or exceeds the bid placed by the first bidder is then examined. A proposed bid is generated which is equal to the bid placed by the first bidder plus the minimum increment. If a determination is made that the proposed bid exceeds the proxy bid, the bidder who placed the proxy bid is awarded the item for the proxy bid. If, however, the proposed bid does not exceed the proxy bid, the bidder who placed the proxy bid is awarded the item for the proposed bid. Thus, an off-increment bid is generated which becomes a high bid for the item utilizing the proxy bid. The item is sold for an off-increment bid which was placed through a proxy bid.

For example, suppose bidder A has entered a bid for $30 and also holds a proxy bid for $40.00. Also suppose there is a minimum increment of $5.00. If bidder B places a bid for $37.00, bidder A will be awarded the item for $40.00. In this example, a proposed bid was generated which was $42.00. The proposed bid exceeded the proxy bid so the item was sold to bidder A for the proxy bid, $40.00. If bidder A's proxy had been $45.00 instead, bidder A would be awarded the item for the proposed bid of $42.00. The proposed bid did not exceed bidder A's proxy bid of $45.00 so the item was sold to bidder A for $42.00.

Turning to FIG. 1, in which the general architecture of the system of the invention is shown, an Interactive Offer System ("IOS") 51 is associated with an offering database 52. The offering system 50 is included in the larger architecture 59 which includes the brokers' consoles 58, the administrator console 56, and the traders' consoles 54. All consoles and the interactive offering server may communicate either as an integrated package within one computer system, or as separate computer systems integrated and communicating over a computer network such as the internet.

In the general architecture of FIG. 1, the manufacturer or service provider's goods availability list 55 is received by the trader consoles 54. The trader then creates proposed offerings by filtering the availability list against the broker profile matrices 40 for his broker(s). Those proposed offerings are input into the offering data base 52, which are then retrieved by the administrator using his administrator console 56.

The administrator then authorizes the proposed offerings and makes a note or change in the offering data base records to indicate such authorization.

During the open bidding process, the brokers may use their consoles, such as web browser personal computers 58, to retrieve their offerings, and to submit bids via the IOS 51. When a broker makes contact with the interactive offering server, his identity is first verified by an Authentication Server 57, according to the preferred embodiment.

In response to the broker's request for products or services offerings, the IOS queries the offering database 52 and presents the broker with offerings to which he or she is entitled. An authentication server 57 is included in the preferred embodiment so as to allow the interactive offering server to authenticate the broker prior to presenting any offerings to the broker. As such, the general architecture 59 as shown in FIG. 1 provides each broker with one or more offerings which have been authorized and which have been filtered to show only available materials or services on which he is entitled to bid.

Figure 2:
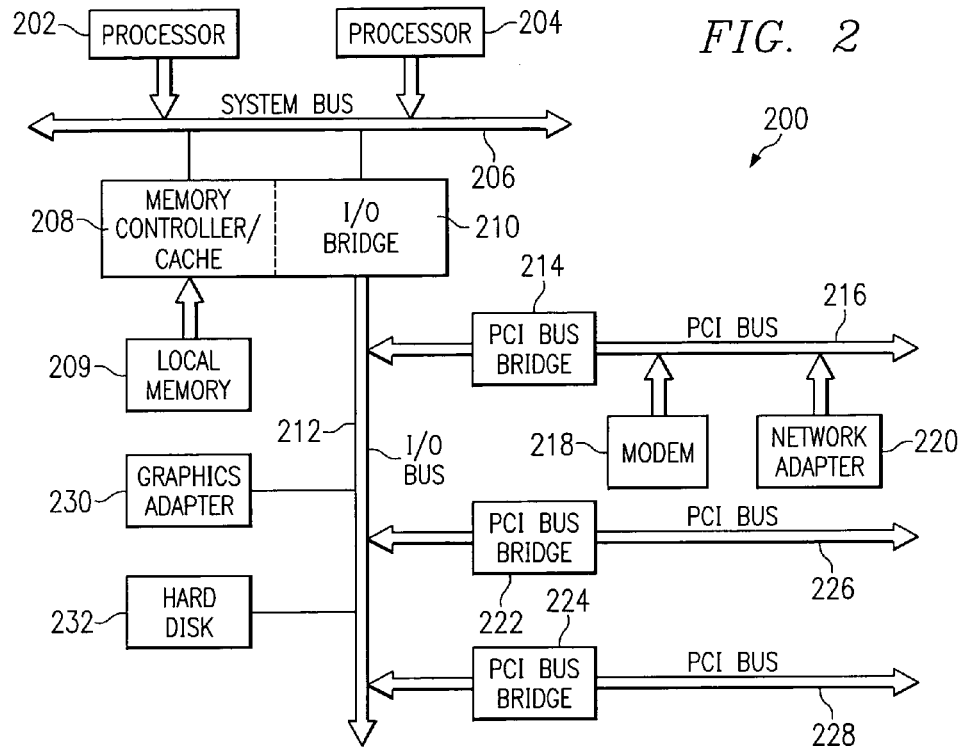
FIG. 2 is an exemplary block diagram of a server according to the present invention.

FIG. 2 illustrates a block diagram of a data processing system which may be implemented as IOS server 51 in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to other network computers may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
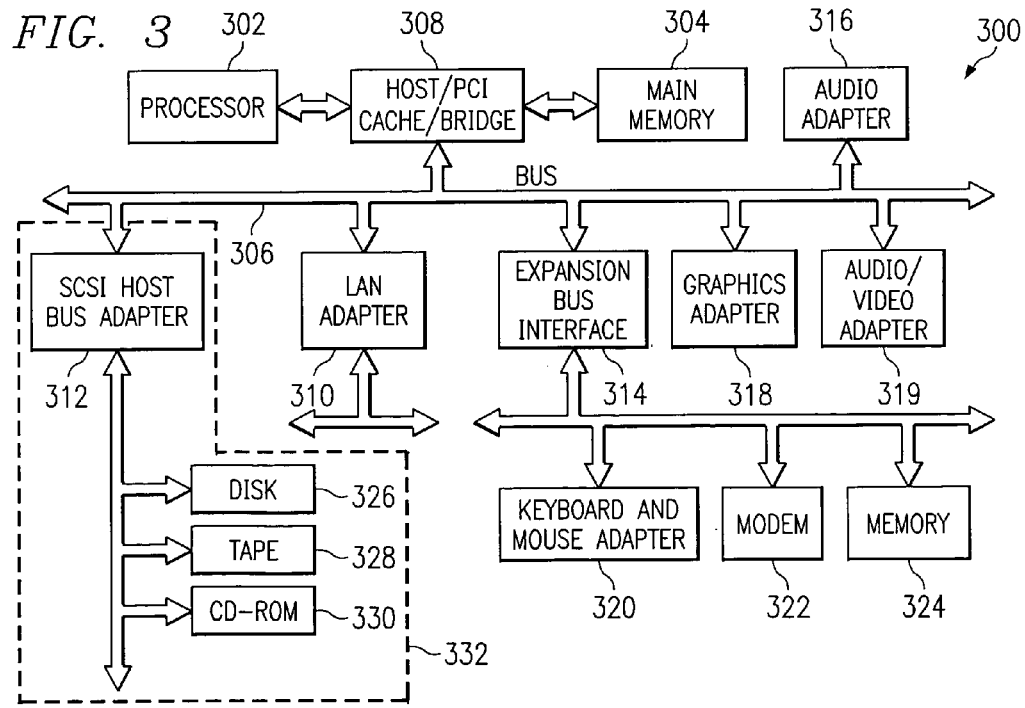
FIG. 3 is an exemplary block diagram of a client according to the present invention.

FIG. 3 depicts a block diagram which illustrates a data processing system which may be implemented as one or more broker consoles 58. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4A:
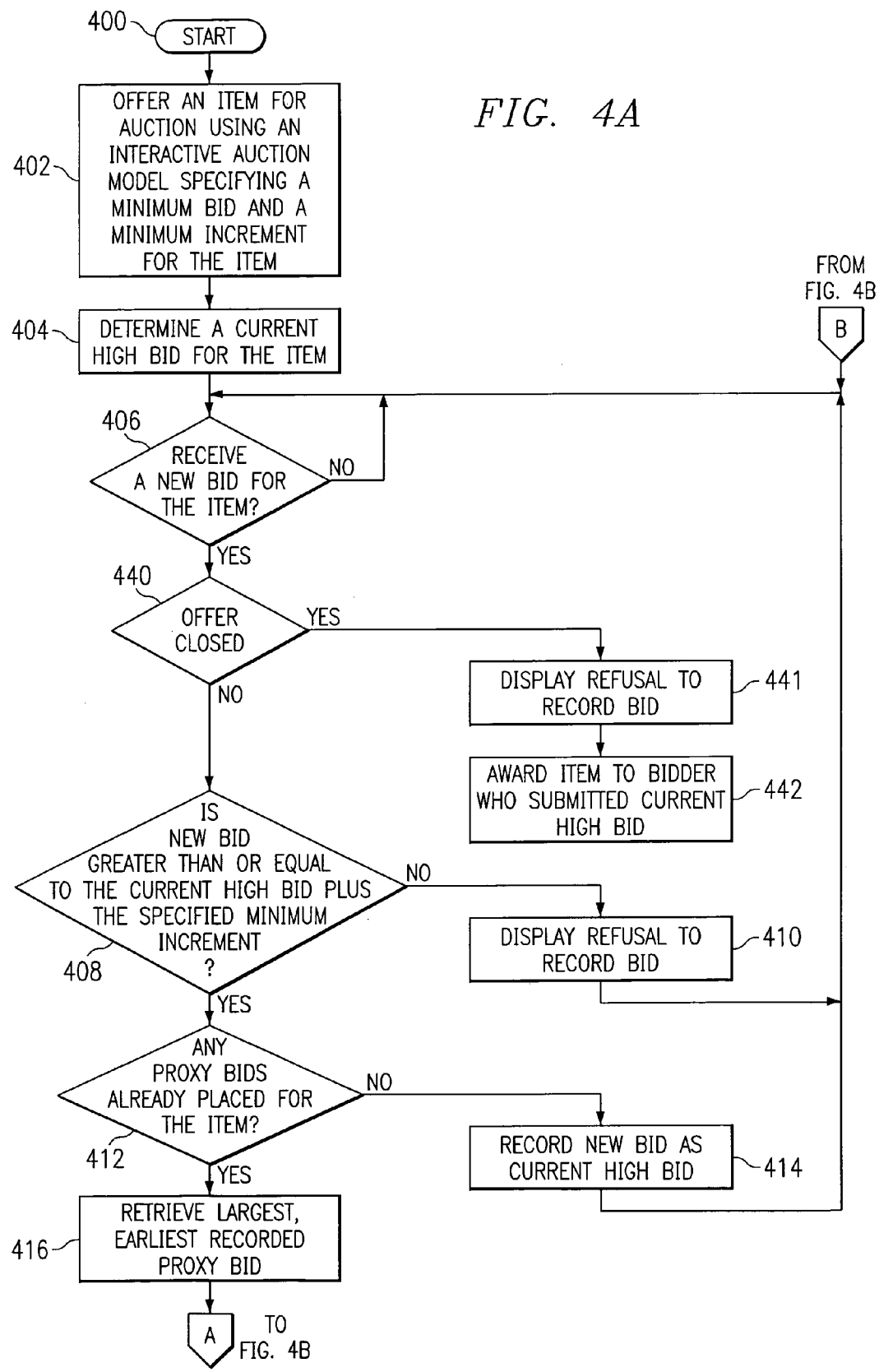
FIG. 4 illustrates a high level flow chart which depicts the generation of off-increment proxy bids by an electronic auction in accordance with the method and system of the present invention.
Figure 4B:
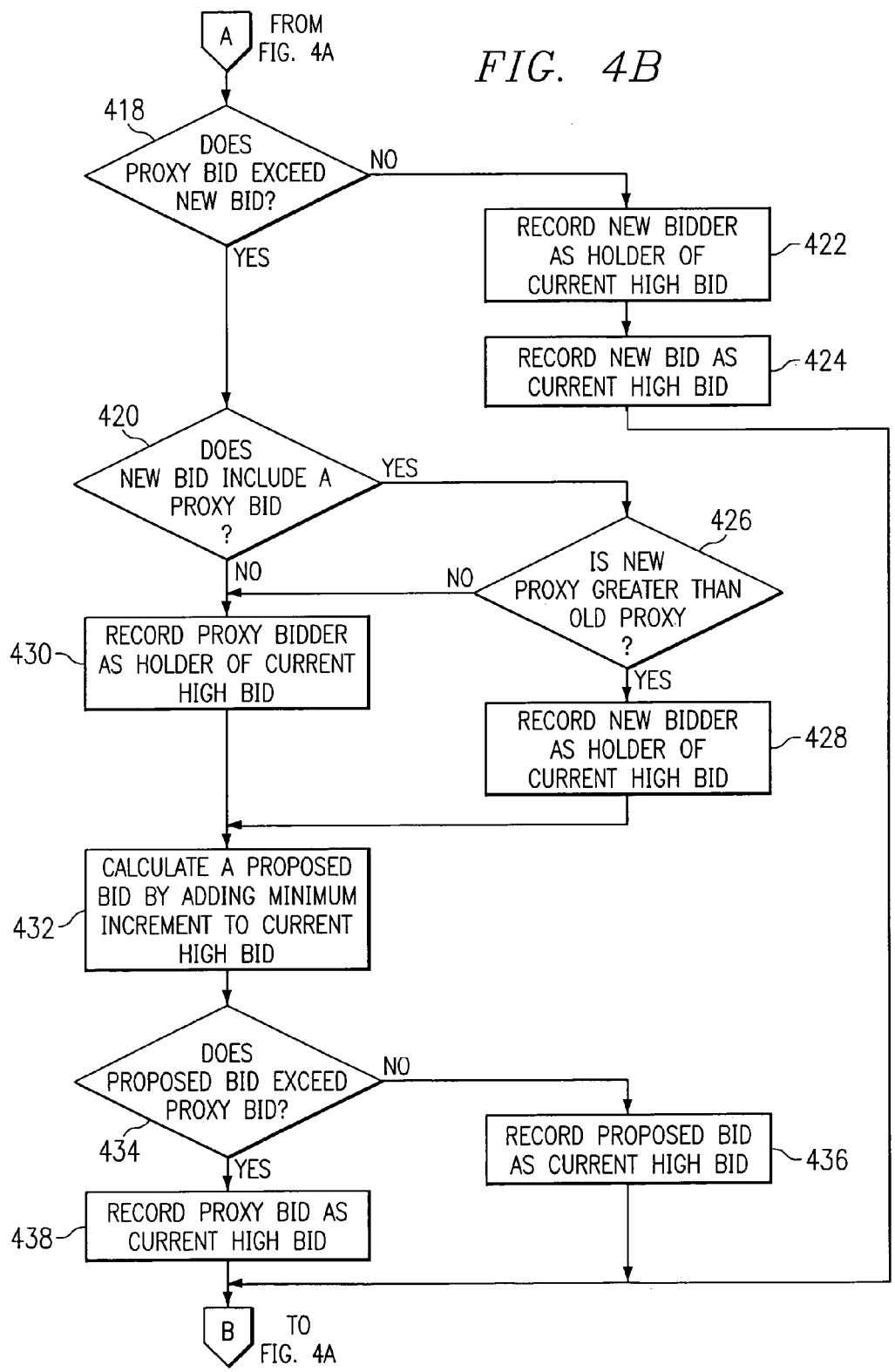

FIG. 4 illustrates a high level flow chart which depicts an electronic auction which generates off-increment proxy bids according to the present invention. The process starts as depicted by block 400 and thereafter passes to block 402 which illustrates an item being offered for auction using an interactive auction model. A minimum bid and a minimum increment are specified for this item. An offer period is also specified. Bids are accepted for the item during the offer period. When the offer period has ended, the highest bidder will be awarded the purchase of the item for the current high bid. Thereafter, block 404 depicts a determination of a current high bid for the item. Next, block 406 illustrates a determination of whether or not a new bid has been received for the item. If a determination is made that no new bid has been received, the process passes back to block 406.

Referring again to block 406, if a determination is made that a new bid has been received, the process passes to block 440 which depicts a determination of whether or not the offer period for this item has closed. If a determination is made that the offer period has not closed, the process passes to block 408. Referring again to block 440, if a determination is made that the offer period has closed, the process passes to block 441 which depicts displaying a refusal to record the bid. Next, block 442 illustrates awarding the item to the bidder who submitted the current high bid.

Referring again to block 408, block 408 illustrates a determination of whether or not the new bid is greater than or equal to the current high bid plus the minimum increment specified for the item. If a determination is made that the new bid is not greater than or equal to the current high bid plus the specified minimum increment, the process passes to block 410. Block 410 depicts the displaying of a refusal to record the bid. The process then passes to block 406.

Referring again to block 408, if a determination is made that the new bid is greater than or equal to the current high bid plus the minimum increment specified for the item, the process passes to block 412 which illustrates a determination of whether or not there are any proxy bids already placed for the item. If a determination is made that there are no proxy bids currently placed for the item, the process passes to block 414 which depicts recording the new bid as the current high bid. The process then passes to block 406.

Referring again to block 412, if a determination is made that there is at least one proxy bid already placed for the item, the process passes to block 416 which illustrates the retrieval of the largest, earliest recorded proxy bid. Next, block 418 depicts a determination of whether or not the retrieved proxy bid exceeds the new bid. If a determination is made that the proxy bid does not exceed the new bid, the process passes to block 422 which illustrates recording the new bidder as the holder of the current high bid. Next, block 424 depicts recording the new bid as the current high bid. The process then passes to block 406.

Referring again to block 418, if a determination is made that the retrieved proxy bid does exceed the new bid, the process passes to block 420 which illustrates a determination of whether or not the new bid includes a proxy bid. If a determination is made that the new bid does include a proxy, the process passes to block 426 which depicts a determination of whether or not the new proxy bid is greater than the old proxy bid. If a determination is made that the new proxy is not greater than the old proxy, the process passes to block 430.

Referring again to block 426, if a determination is made that the new proxy bid is greater than the old proxy bid, the process passes to block 428 which illustrates recording the new bidder as the holder of the current high bid. The process then passes to block 432.

Referring again to block 420, if a determination is made that the new bid does not include a proxy, the process passes to block 430 which illustrates recording the proxy bidder as the holder of the current high bid. Next, block 432 depicts calculating a proposed bid by adding the minimum increment to the current high bid. The process then passes to block 434 which illustrates a determination of whether or not the proposed bid exceeds the proxy bid. If a determination is made that the proposed bid does not exceed the proxy bid, the process passes to block 436 which depicts recording the proposed bid as the current high bid. The process then passes to block 406.

Referring again to block 434, if a determination is made that the proposed bid does exceed the proxy bid, the process passes to block 438 which illustrates recording the proxy bid as the current high bid. The process then passes to block 406.

For the purposes of this disclosure, the term "item" means something which is offered for sale in an auction on which a potential buyer may bid. An item may include one or more things. For example, the term "item" as used herein may refer to a single part lot which include multiple parts. "Item" has also been used herein to refer to multiple part lots.

It will be understood by those skilled in the art and from the foregoing description that various modifications and changes may be made in the preferred embodiment of the present invention without departing from its spirit and scope. It is intended that this description is for purposes of illustration only and should not be construed in a limiting sense. The scope of this invention should be defined by the following claims.

What is claimed is:

1. A method in an electronic auction for generating off-increment proxy bids, said method comprising the computer implemented steps of:

specifying a minimum increment for bidding on an item;
receiving a bid for said item from a first bidder that is a current high bid for said item;
identifying a previously recorded proxy bid from a second bidder that is greater than said current high bid but not greater than said current high bid plus said minimum increment; and
generating by said electronic auction an off-increment bid that becomes a new high bid for said item utilizing said proxy bid, wherein said second bidder holds the new high bid for said item, further wherein said off-increment bid does not exceed said bid received from said first bidder by said minimum increment, and wherein said off-increment bid does not exceed said proxy bid;
generating a proposed bid by said electronic auction, said proposed bid being equal to said minimum increment plus a current high bid for said item;
determining if said proposed bid exceeds said proxy bid; and
in response to a determination that said proposed bid does exceed said proxy bid, awarding said item to said second bidder for said off-increment bid, wherein said off-increment bid is equal to said proxy bid.

2. An electronic auction system for generating off-increment proxy bids, comprising:

a bus system;
a communications system connected to the bus system;
a memory connected to the bus system, wherein the memory includes a set of instructions; and
a processing unit connected to the bus system, wherein the processing unit executes the set of instructions to identify a minimum increment for bidding on an item; receive a bid received for said item from a first bidder that is a current high bid for said item; identify a previously recorded proxy bid from a second bidder that is greater than said current high bid but not greater than said current high bid plus said minimum increment; generate an off-increment bid by said electronic auction that becomes a new high bid for said item utilizing said proxy bid, wherein said second bidder holds the new high bid for said item, further wherein said off-increment bid does not exceed said bid received from said first bidder by said minimum increment, and wherein said off-increment bid does not exceed said proxy bid; generate a proposed bid, said proposed bid being equal to said minimum increment plus a current high bid for said item; determine if said proposed bid exceeds said proxy bid; and, in response to a determination that said proposed bid does exceed said proxy bid, award said item to said second bidder for said off-increment bid, wherein said off-increment bid is equal to said proxy bid.

3. A computer readable medium in an electronic auction including computer usable program code for generating off-increment proxy bids, said computer usable program code comprising:

instruction means for specifying a minimum increment for bidding on an item;
instruction means for receiving a bid for said item from a first bidder that is a current high bid for said item;
instruction means for identifying a previously recorded proxy bid from a second bidder that is greater than said current high bid but not greater than said current high bid plus said minimum increment; and
instruction means for generating an off-increment bid that becomes a new high bid for said item utilizing said proxy bid, wherein said second bidder holds the new high bid for said item, further wherein said off-increment bid does not exceed said bid received from said first bidder by said minimum increment, and wherein said off-increment bid does not exceed said proxy bid;

instruction means for generating a proposed bid, said proposed bid being equal to said minimum increment plus a current high bid for said item;

instruction means for determining if said proposed bid exceeds said proxy bid; and instruction means for in response to a determination that said proposed bid does exceed said proxy bid, awarding said item to said second bidder for said off increment bid, wherein said off-increment bid is equal to said proxy bid.

* * * * *